United States Patent [19]

Rudzinski

[11] Patent Number: 4,917,796
[45] Date of Patent: Apr. 17, 1990

[54] LIFT WITH AUTOMATED DUMP
[75] Inventor: Stanley Rudzinski, Chicago, Ill.
[73] Assignee: Rudz Enterprises, Inc., Chicago, Ill.
[21] Appl. No.: 239,539
[22] Filed: Sep. 1, 1988
[51] Int. Cl.[4] .................. B01D 35/02; B65G 47/40
[52] U.S. Cl. .............................. 210/159; 198/703; 198/706; 198/712; 210/162; 414/422; 414/425
[58] Field of Search ............... 210/158, 159, 160, 162, 210/401, 408, 413, 526, 527, 791; 198/706, 710, 712, 703; 209/271, 285; 414/422, 425

[56] References Cited

U.S. PATENT DOCUMENTS

| | | | |
|---|---|---|---|
| 2,107,890 | 2/1938 | Frank | 198/706 |
| 4,107,040 | 8/1978 | Rudolph et al. | 210/413 |
| 4,214,989 | 7/1980 | Rudolph et al. | 210/159 |
| 4,265,750 | 5/1981 | Meunier | 210/159 |
| 4,447,323 | 5/1984 | Jackson | 210/159 |
| 4,472,273 | 9/1984 | Hagihara | 210/159 |
| 4,518,494 | 5/1985 | Jackson | 210/159 |
| 4,561,975 | 12/1985 | Schloss, Jr. | 210/159 |
| 4,579,652 | 4/1986 | Bielagus | 209/271 |
| 4,597,864 | 7/1986 | Wiesmann | 210/401 |
| 4,709,804 | 12/1987 | Duperon | 210/160 |
| 4,722,433 | 2/1988 | Gough | 198/706 |
| 4,725,365 | 2/1988 | Albrecht, III | 210/159 |
| 4,750,606 | 6/1988 | Gough | 198/706 |
| 4,780,199 | 10/1988 | Ezzell et al. | 210/159 |
| 4,792,394 | 12/1988 | Rudzinski | 210/159 |
| 4,812,231 | 3/1989 | Wiesemann | 210/160 |
| 4,817,782 | 4/1989 | Gough | 198/706 |
| 4,825,998 | 5/1989 | Gough | 198/703 |
| 4,838,410 | 6/1989 | Gough | 198/706 |
| 4,851,114 | 7/1989 | Minichello | 210/162 |

Primary Examiner—Frank Spear
Assistant Examiner—Joseph Drodge
Attorney, Agent, or Firm—Leydig, Voit & Mayer

[57] ABSTRACT

A lift apparatus adapted for reliable, substantially maintenance-free operation in material transfer systems, including systems that are subject to considerable contamination. The lift apparatus includes an open top container, a support plate for normally supporting the container in upright position, and a ball screw drive for moving the support plate and container between a filling station in which material may be introduced into the container and a discharge station. The container is supported for relative pivotal movement with respect to the support plate, and a chain and sprocket arrangement is provided for automatically pivoting the container to a dumping position as it is raised into the discharge station and for returning the container to its normal upright position as it is lowered from the discharge station following dumping.

23 Claims, 5 Drawing Sheets

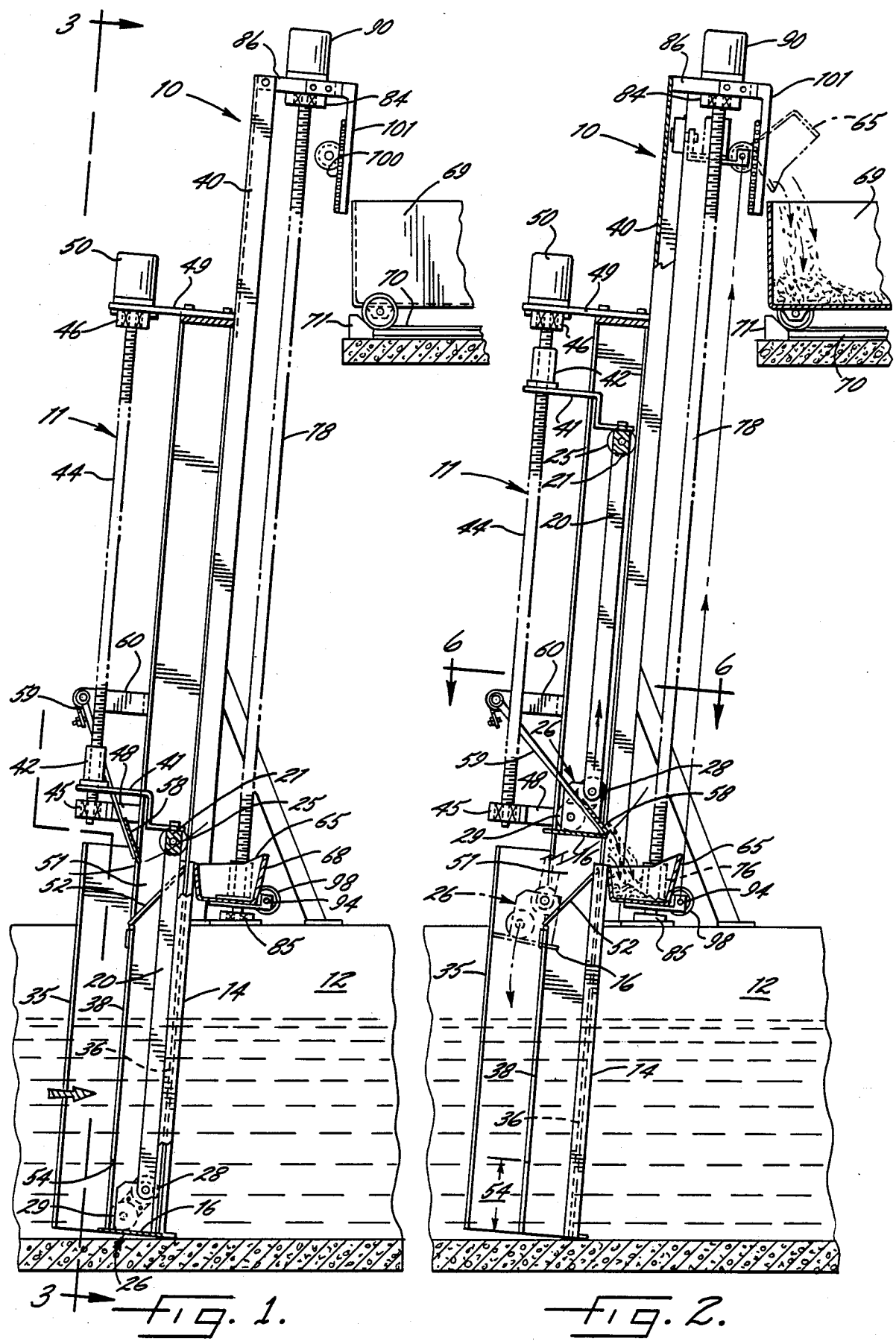

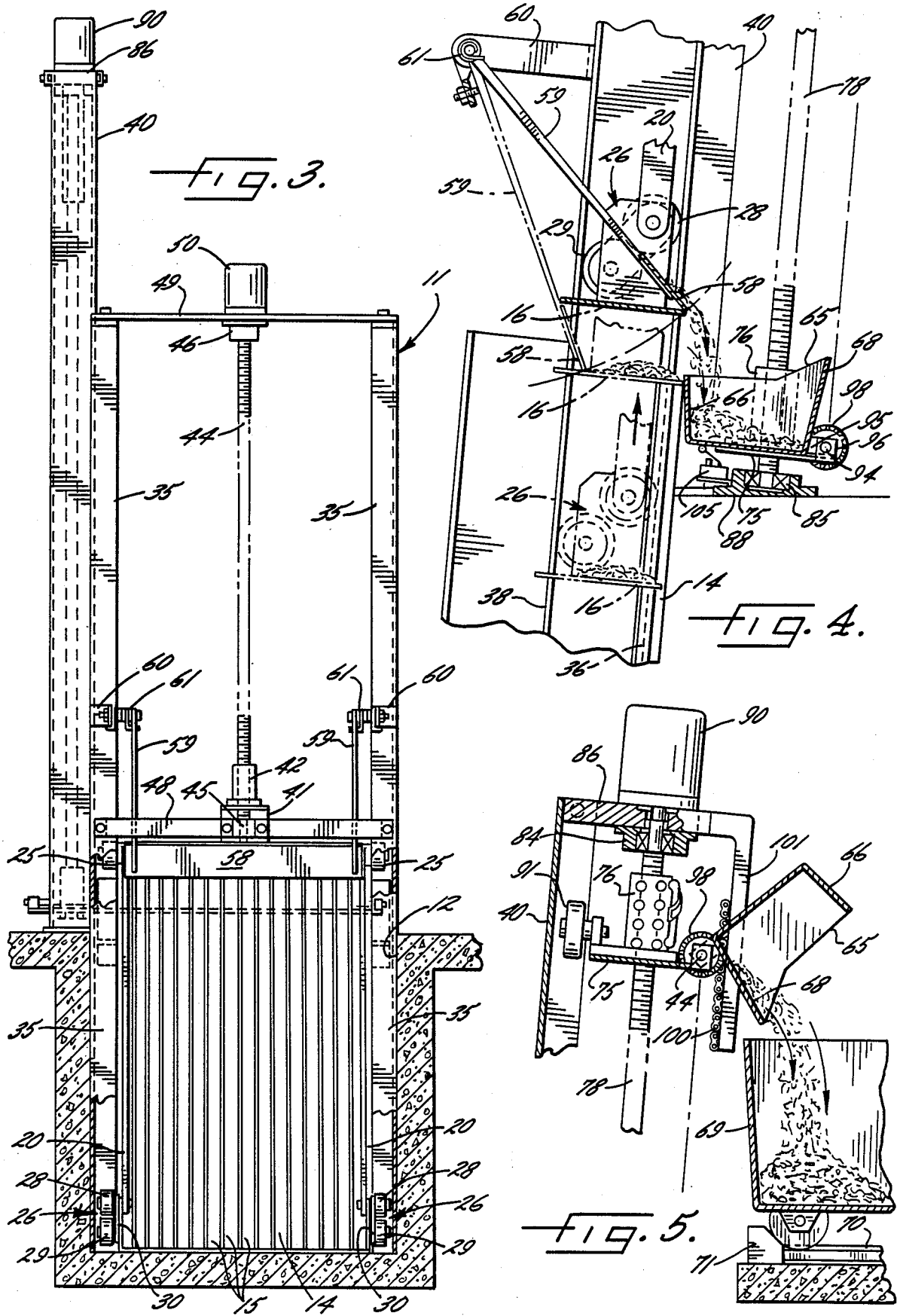

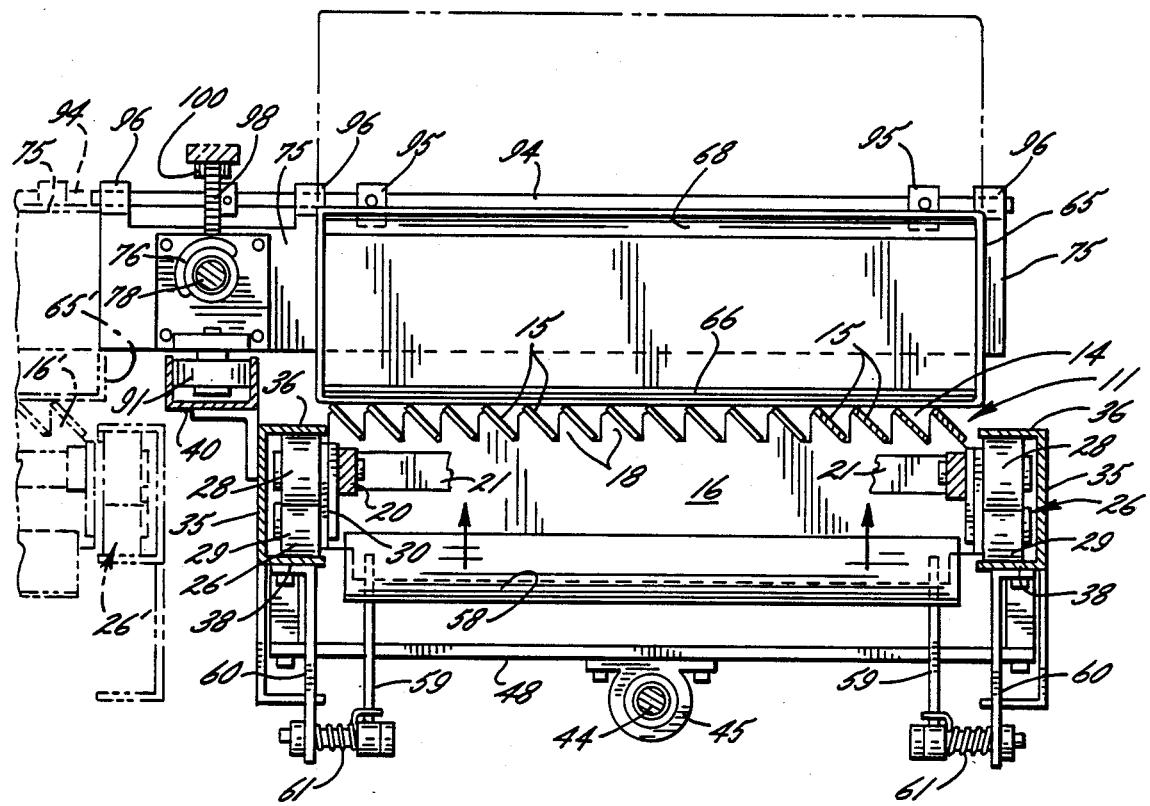
fig. 6.
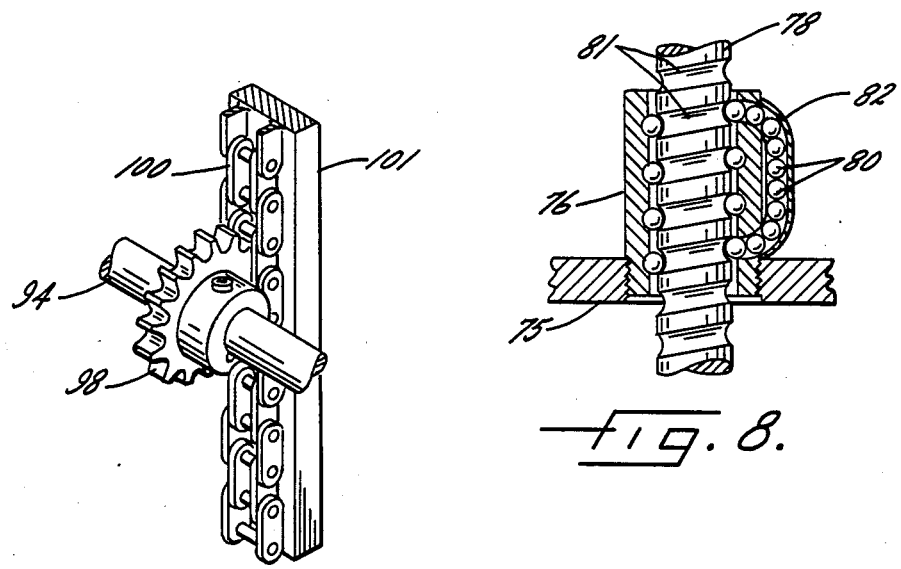
fig. 7.
fig. 8.

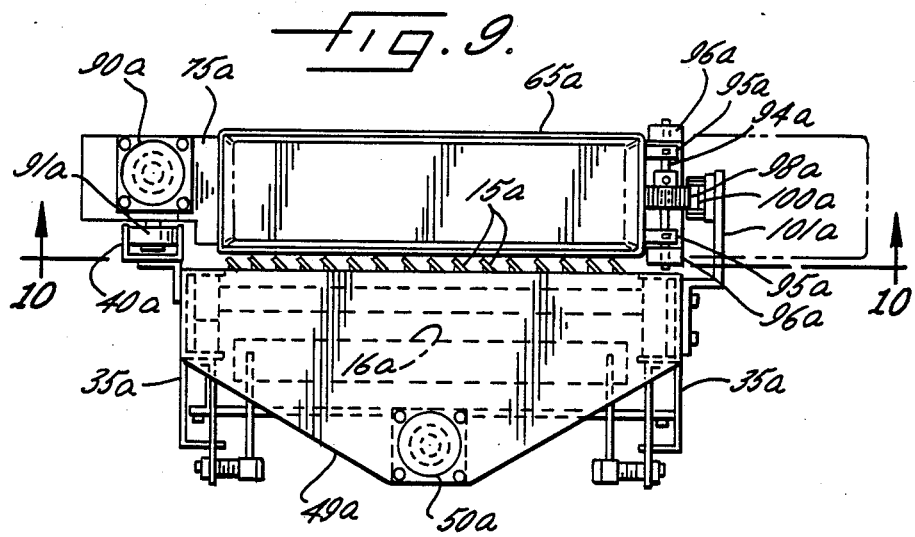
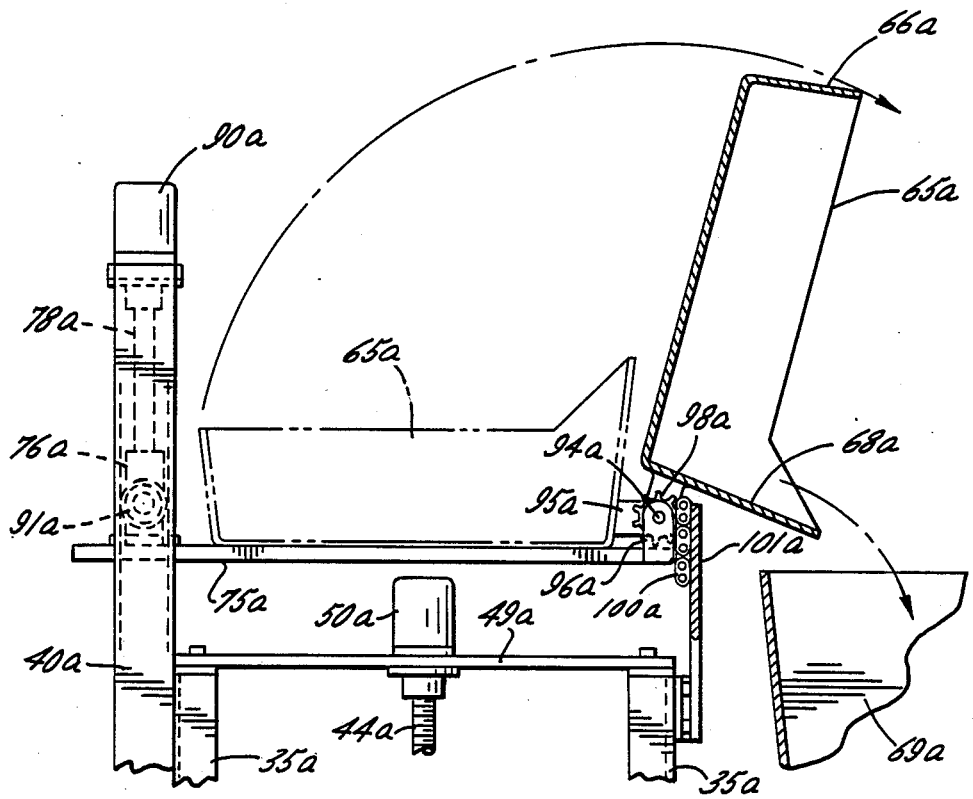

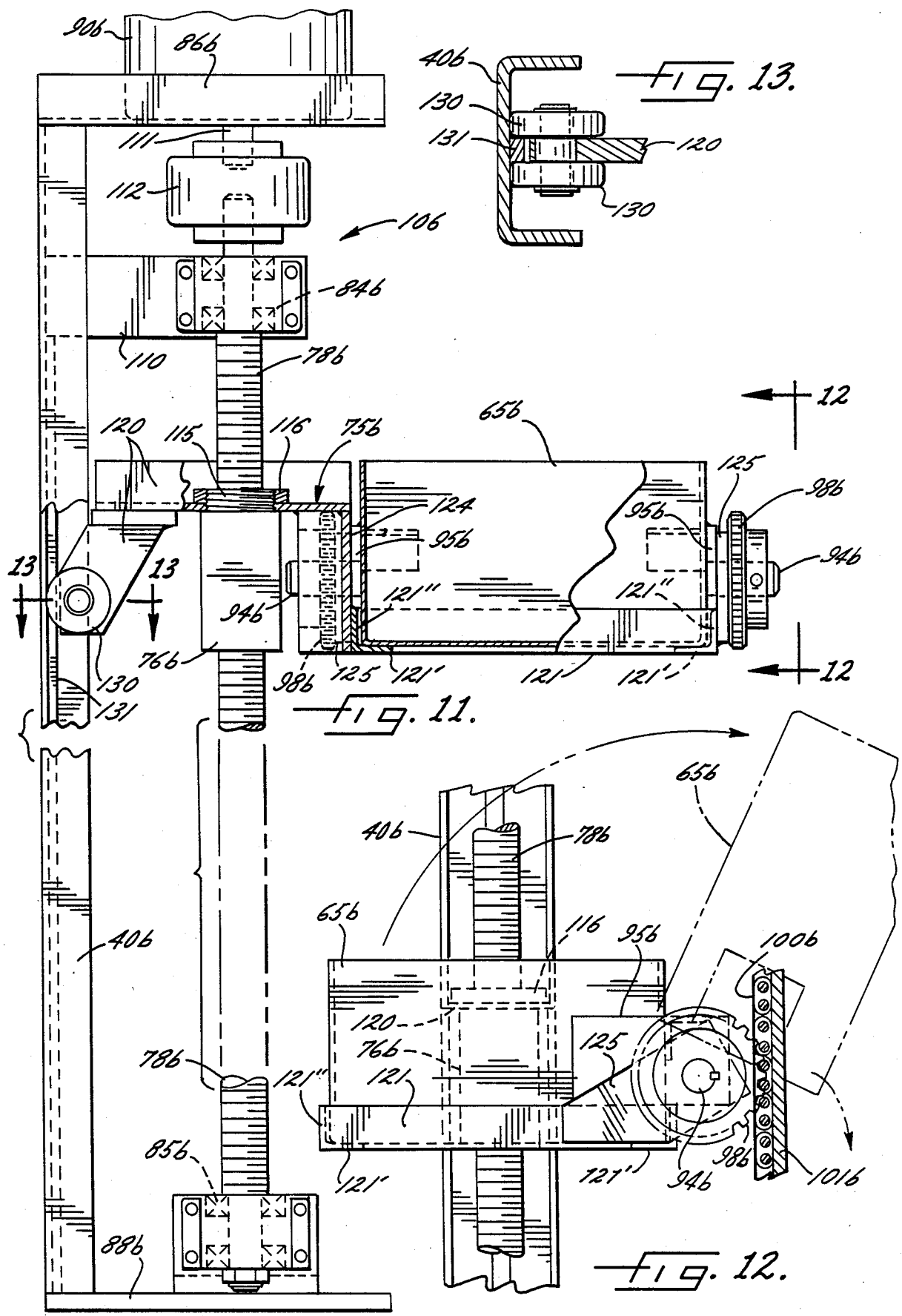

LIFT WITH AUTOMATED DUMP

DESCRIPTION OF THE INVENTION

The present invention relates generally to lifts, and more particularly, to a lift apparatus with an automated dump which has particular utility for use with screening devices for removing solid materials from liquid flow streams.

Screening devices commonly are used for removing solid materials from liquid flow streams, such as in waste water treatment systems, food processing lines, and the like. Such devices typically include a screen that is disposed in the liquid flow stream for screening solids and debris from the flow stream, and a rake that is cyclically operated for removing the accumulated materials from the screen. With such screening devices, a lift often is employed for receiving and elevating the screened debris and solids to a suitable discharge height for dumping into a transfer conveyor, bin, truck or the like. Such lifts generally include a solids receiving container into which the solids are received from the screening device, and means for raising the container or dump to the desired elevated location for dumping. Because movement of the lift container is dictated by the specific arrangement of the screening device and transfer conveyor or receiving bin, and often required multi-directional transfer, conventional lifts have been relatively complicated in construction and operation and require custom design for proper installation. Falling debris and other contaminating materials that can exist or accumulate on the equipment also can hinder proper operation, particularly when precision interaction is required between moving mechanical parts. Lifting of heavy water laden loads has presented further operating problems. Hence, existing lifts have been relatively expensive, and by virtue of their complexity and the environments in which they are used, subject to considerable maintenance.

It is an object of the present invention to provide a lift apparatus having an automated dump which has a simplified design and is adapted for more reliable maintenance free operation.

Another object is to provide such a lift apparatus which operates with more tolerance to falling debris and accumulating contaminants.

A further object is to provide a lift apparatus as characterized above which is adapted for diversified use.

Yet another object is to provide a lift apparatus of the above kind which is adaptable to installations where space is limited. A related object is to provide a lift apparatus which is adaptable for receiving solids from a plurality of flow streams or processing lines.

Another object is to provide such a lift apparatus which is adapted for reliably handling relatively heavy loads.

Still a further object is to provide a lift of the foregoing type which lends itself to more economical manufacture.

Other objects and advantages of the invention will become apparent upon reading the following detailed description and upon reference to the drawings, in which:

FIG. 1 is a side-elevational view of an illustrative solids removal system having a lift apparatus embodying the present invention;

FIG. 2 is a vertical section, similar to FIG. 1, showing the dump of the lift apparatus in a lowered position being filled with solids that have been removed from the flow stream, and in phantom, showing the dump in a raised unloading position;

FIG. 3 is a transverse section of the illustrated system, taken in the plane of line 3—3 in FIG. 1;

FIG. 4 is an enlarged vertical section showing the dump in a lowered filling position;

FIG. 5 is an enlarged vertical section showing the dump in a raised unloading position;

FIG. 6 is an enlarged horizontal section taken in the plane of line 6—6 in FIG. 2;

FIG. 7 is an enlarged perspective of the automated dump tipping means for the lift apparatus;

FIG. 8 is an enlarged section of the ball screw drive for the lift apparatus;

FIG. 9 is a horizontal section of an alternative form of lift apparatus embodying the present invention;

FIG. 10 is a vertical section of the lift apparatus shown in FIG. 9;

FIG. 11 is a side-elevational view, in partial section, showing still another alternative embodiment of lift apparatus according to the present invention;

FIG. 12 is an end view taken in the plane of line 12—12 in FIG. 11; and

FIG. 13 is an enlarged horizontal section taken in the plane of line 13—13 in FIG. 11, While the invention is susceptible of various modifications and alternative constructions, certain illustrated embodiments thereof has been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

Referring now more particularly to the drawings, there is shown a lift apparatus 10 embodying the present invention, which for purposes of illustration, is associated with a bar screening apparatus 11 disposed within a flow channel 12 through which a liquid flow stream is passing in the direction of the arrow. The illustrated flow stream may be part of a waste treatment system, a fruit or vegetable washing or processing operation, or other processing line in which the stream carries solid materials that must be separated and removed from the liquid. The screening apparatus 11, which may be of a type disclosed in applicant's co-pending application Ser. No. 908,828 filed Sept. 18, 1986, includes a screen 14 consisting of a plurality of flat bars 15 (FIG. 6) supported in closely spaced parallel relation for defining a plurality of narrow elongated flow openings there between. The bar screen 14 lies in a plane with its upper end slanted in a downstream direction, and the bars each have an upstream face disposed at an angle to the direction of flow so as to prevent a direct gap from being offered to solid materials in relation to the direction of flow, yet defining sufficiently wide openings between adjacent bars to allow substantially unimpeded flow of the liquid portion of the flow stream.

For removing solids that accumulate on the bar screen 14 as a result of the screening process, the screening apparatus 11 includes a rake 16 which has a series of projections 18 (FIG. 6) designed to fit between adjacent bars of the screen 14. As set forth in detail in the aforesaid co-pending application Ser. No. 908,828, means are provided for raising and lowering of the rake 16 relative the screen 14 in such a way that the rake projections 16 make contact with the bar screen during upward movement and are displaced from the screen during lowering return movement.

The rake 16 in this instance is affixed to the lower end of linking arms 20, which are pivotably coupled to a cross brace member 21 (FIG. 3). For supporting the rake 16 for translational movement with respect to the screen 14, forward rollers 25 are disposed at opposite ends of the cross brace 21 and a dual roller arrangement 26 is provided at opposed ends of the rake 16. The dual roller arrangements 26 each comprise a lower roller 28 mounted in the plane of the linking arms 20 and a roller 29 mounted in raised offset relation to the lower roller 28 on a support plate 30 secured to a respective end of the rake 16. For guiding movement of the rake 16 relative to the screen, support rails 35 each including a lower guide rail 36 and an upper guide rail 38 are disposed on opposite sides of the screen. The support rail 35 on one side of the screen is affixed to the lower end of an upstanding frame member 40, which is angled in a downstream direction similarly to the screen.

In order to move the rake 16, an angle plate 41 attached to the cross brace 21 carries a ball bearing nut 42 which operatively engages a ball screw 44. The ball screw 44 is rotatably supported adjacent its opposed ends by bearings 45, 46, supported above the screen on respective mounting plates 48, 49. The uppermost end of the screw 44 is rotatably driven by a suitable drive motor 50 mounted on the plate 49 for moving the nut 42, and thus the rake 16 connected thereto, relative to the screw 44 and screen 14.

For raising the rake away from the screen after a raking operation to permit return of the rake to a ready position at the bottom of the screen, each upper guide rail 38 is formed with a cut-out 51 and a pivot plate 52 is pivotably secured to the upper guide rail 38 at the location of the cut-out. Each pivot plate 52 is movable from a normal downwardly pivoted position, as shown in FIGS. 1 and 2, with the lower end thereof engaging the lower guide rail 36 to a raised position that permits movement of the dual rollers 28, 29 past the pivot plates 52 for completing an upward raking stroke. After the dual rollers 28, 29 have moved upwardly beyond the pivot plates 52 during a raking stroke, the pivot plates 52 will fall downwardly by gravity against the lower guide rails 36 so as to serve as ramps connecting the lower and upper guide rails 36, 38. The drive motor 50 may then be operated in a reverse direction to move the rake 16 in an opposite direction, proceeding first onto the ramps defined by the pivot plates 52 and then onto the upper guide rails 38, thereby lifting the rake projections 18 away from their operative position between the bars of the screen. Continued reverse movement of the rake 16 and rollers 28 on the upper guide rail 38 will bring the rollers to a cut-out section 54 adjacent the bottom of the guide rails, at which point the rollers will drop back onto the lower rails 36 positioning the rake in a ready position for the next cycle of operation. It will be understood that proximity switches or the like for controlling the motor 50 may be located at appropriate positions for determining the start and end of the required downward and upward motion of the ball nut 42 and the rake 16.

To remove debris and solids collected on the rake 16 during an upward stroke when the rake reaches an uppermost discharge position, a wiper blade 58 is provided, as best shown in FIGS. 1, 2 and 4. The wiper blade 58 is supported at opposed ends by arms 59 pivotably mounted on supports 60 extending forwardly of the rails 35 and is biased by springs 61 into a normal position, shown in phantom in FIG. 4, with the lowermost end thereof disposed within the path of upward travel of the rake 16 during an upward raking stroke. Upon engagement of the lowermost end of the wiper blade 58 by the rake 16, further upward movement thereof causes the wiper blade 58 to pivot in a counterclockwise direction, as viewed in FIG. 4, which in turn causes the blade to scrap across the rake so as to discharge the solids accumulated thereon in right hand direction, as viewed in FIG. 4. Lowering of the rake 16 at the commencement of the return stroke, permits the wiper 58 blade to be moved to its original position, shown in phantom in FIG. 4, under the bias of the springs 61. Further downward movement of the rake on the return stroke, causes it to proceed onto the ramps defined by the pivot plates 52, as previously described.

In accordance with the invention, a simple and substantially maintenance free lift apparatus is provided which is adapted for receiving materials removed from the rake and raising the materials to a desired elevated location for automatic dumping into a transfer conveyor, or other receiving means, as incident to be moved to the elevated location. To this end, the illustrated lift apparatus 10 comprises a dump or container 65 which is movable from a lower solids receiving station, shown in FIGS. 2 and 4, and a raised discharge station, shown in FIG. 5 and in phantom in FIG. 2. The dump in this case is a rectangular configured open top container having a forward side 66 that is positionable adjacent the rear side of the screen 14 at the lower receiving station and a rear, relatively higher side 68 which facilitates direction of the material during discharge into a transfer container 69 at the discharge station. The transfer container 69 in this instance is a wheeled cart, supported on an inclined track 70 having a stop 71 that locates the container 69 at a proper predetermined location for receiving the contents from the dump 65 at the discharge station. It will be understood that alternatively a moving belt conveyor, or other receiving bin, could be utilized for receiving the solid materials from the dump.

For moving the dump 65 between the lower solid receiving station and the raised discharge station, the dump 65 is carried by a support plate 75 which has affixed thereto a ball nut 76 that cooperates with a ball screw 78. The ball screw 78 and nut 76, like the ball screw drive for the rake 16, may be of a conventional type commercially available from Warner Electric Company. Such ball nuts comprise a plurality of balls 80 which are circulated through a tangential feed 82 into passageways 81 defined by the ball screw 78 and housing for the nut, as illustrated in FIG. 8. The ball screw 78 in this instance is rotatably mounted in upper and lower bearings 84, 85, which in turn are supported by respective mounting plates 86, 88 secured in rearwardly extending fashion from the frame member 40. The mounting plate 88 for the lower bearing 85 is disposed closely adjacent the upper end of the screen 14 while the mounting plate 86 for the upper bearing 84 is disposed adjacent the upper end of the frame member 40. The upper end of the ball screw 78 is driven by a motor 90, such that rotation of the ball screw 78 in one direction will advance the ball nut 76 and the dump 65 in an upward direction relative to the ball screw 78 and operation of the motor in a reverse direction will move the ball nut 76 and dump 65 in an opposite direction. For guiding raising and lowering movement of the dump 65 relative to the ball screw 76, a roller 91 is rotatably supported in forwardly extending fashion from the support plate 75, and the frame member 40 has a rearwardly facing channel construction adapted for the receiving and guiding movement of the roller 91 (FIG. 5). Such a ball screw drive has been found to enable reliable movement of loaded dump containers with efficient power utilization.

In accordance with an important aspect of the invention, means are provided for automatically tipping the dump in a manner for discharging the contents thereof at the upper discharge station as an incident to raising the dump to such station and for automatically returning the dump to its normal upright position as an incident to lowering movement away from said discharge station. More particularly, the dump is supported for pivotable movement relative to its support plate and is automatically pivotable by chain and sprocket means as the dump is moved into and out of the discharge station. In the illustrated embodiment, a pivot shaft 94 is fixedly mounted on brackets 95 extending rearwardly from the lower opposed ends of the dump (FIGS. 4 and 6). The shaft 94 in turn is pivotally supported in upstanding lugs 96 fixed to the top of the support plate 75. For rotating the pivot shaft 94, and thus the dump 65 affixed thereto, relative to the support plate 75, a sprocket 98 is affixed to an end of the pivot shaft 94 extending outwardly from one side of the dump and is adapted for engagement with a conventional link chain 100 supported in rearwardly spaced parallel relation to the upper end portion of the ball screw 78. The link chain 100 in this instance is mounted on a flange 101 depending from a rear side of the mounting plate 86 for the drive motor 90. It will be seen that during upward movement of the dump 65 along the ball screw 78, as the pivot shaft sprocket 98 comes into engagement with the lowermost end of the link chain 100, continued upward movement of the dump 65 under the action of the ball screw drive will cause rotational movement of the sprocket 98 relative to the chain 100, and thus, rotational movement of the pivot shaft 94 and dump 65, in a clockwise direction, as viewed in FIGS. 2 and 5. It will be appreciated that travel of the sprocket 98 along the link chain 100 should be sufficient for permitting complete discharge of the contents of the dump, and preferably about 135°. Since the sprocket is supported on an extended end of the shaft 94, it can be seen that the dump is freely movable relative to the chain 100 and its support flange 101 without interference with the chain support flange 101. Upon completion of the dumping operation, reverse operation of the motor 90 and initial lowering movement of the dump 65 will cause rotation of the sprocket 98, pivot shaft 94 and dump 65 in an opposite direction under the control of the sprocket 98 as it moves downwardly over the link chain 100. As the sprocket leaves the proximity of the chain 100 during its downward return movement, the dump is again positioned in a substantially horizontal condition on the support plate 75, which carries the weight of the dump during its raising and lowering movement.

It will be understood that operation of the motor 90 for the dump 65 may be controlled by appropriate proximity switches disposed at upper and lower ends of the ball screw 78 and a suitable control may be provided for preventing operation of the drive screw for the screening device 11 during periods of operation of the motor 90 for the lift 10. In addition, means preferably are provided for sensing when the dump has been filled at the loading station prior to energizing the motor 90. Such means may be a spring biased switch, such as the switch 105 shown in FIG. 4, which senses downward deflection of the dump that results by weight of its contents when filled, or alternatively, photoelectric means may be provided for sensing the level of solid material deposited into the dump container and upon reaching a predetermined level.

In carrying out another aspect of the invention, the lift apparatus 10 is adapted for servicing a plurality of liquid flow streams. As shown in phantom in FIG. 6, a second dump 65' may be supported in cantilever fashion from an opposite side of the support plate 75 for receiving solids from the rake 16' of a securing screening device similar to that previously described associated with a second flow stream. The frame member 40 in this instance is disposed between the dumps 65, 65', serving as the structural support for both. In this embodiment, the pivot shaft 94 extends outwardly from opposite sides of the ball nut 76 and is affixed to both dumps 65, 65' so as to enable simultaneous operation. It will be understood that if the size of the dumps, or the combined loadings thereof, require additional power for lifting, a plurality of ball screw drives may be provided.

Referring now to FIGS. 9 and 10, there is shown an alternative embodiment of the invention wherein items similar to those described above have been given similar reference numerals with the distinguishing "a" added. In this embodiment, a dump 65a is adapted for receiving solids from the rear of a screening device, similar to the embodiment of FIGS. 1-8, while discharging the solids from an end of the container, rather than the back side thereon. To this end, a sprocket carrying shaft 95a is affixed adjacent a lower end of the dump, in perpendicular relation to the plane of the screening device from which solids are received, and a chain 100a is mounted on a vertical support 101a secured in upstanding relation to one of the guide rails 35a. It will be appreciated that by changing the mounting of the pivot shaft on the dump, and the location of the link chain, the dump may be designed for discharging in any desired direction, dictated by the use for which it is intended.

Referring now to FIGS. 11-13 there is shown another alternative embodiment of the invention which has particular utility for transferring heavy and/or large loads, wherein items similar to those described above have been given similar reference numerals with the distinguishing suffix "b" added. The lift apparatus 10b in this instance includes a base 88b, an upstanding frame member 40b supported on the base 88b and a ball screw 78b mounted in upstanding parallel relation to the frame member 40b for relative rotational movement. For rotatably supporting the ball screw 78b, a lower bearing 85b is provided on the base 88b and an upper bearing 84b is supported on a bracket 110 fixed to the frame member 40b.

For rotatably driving the ball screw 78b, a motor 90b is mounted on a support plate 86b affixed in cantilever fashion from the top of the frame member 40b. The motor 90b has a drive shaft 111 connected to the upper end of the ball screw 78b through an appropriate coupling 112. A dump support 75b is fixed to a ball nut 76b operatively mounted on the ball screw 78b for relative vertical movement in response to rotation of the ball screw. The ball nut 78b in this case has an upper threaded end 115 extending through an aperture in the support 75b which is retained in mounted position by a nut 116.

In keeping with the invention, the dump support 75b has a channel formed construction for enhanced rigidity in supporting relatively heavily loaded dump containers. To this end, the dump support 75b includes a horizontal channel 120 to which the upper end of the ball nut 76b is affixed and carries a rectangular dump support platform 121 formed of four angle irons arranged in a rectangular configuration, each of which has a lower flange 121' disposed horizontally for supporting a side of the dump 65b and a vertical flange 121' for defining the outer perimeter of the platform. The dump support platform 121 is affixed in depending fashion to the horizontal channel 120 by means of a depending channel 124 welded to an end of the horizontal channel 120 and to the side of the dump support platform 121.

For supporting the dump 65b for pivotal movement relative to the support platform 121, angle brackets 125 extend upwardly and outwardly from opposite ends of the support platform 121. The angle brackets 125 pivotably support respective pivot shafts 94b affixed to opposite lower ends of the dump 65b through brackets 95b welded in outwardly extending relation to the dump 65b.

In carrying out this embodiment of the invention, a sprocket 98b is affixed to each pivot shaft 94b for engaging a respective link chain 100b fixed in parallel relation to the line of travel of the dump 65b as it is moved into the discharge station. It will be understood that to facilitate handling of heavy loads, the dump also may have a reinforced construction for enhanced rigidity, such as by means of channels or angle irons welded to the sides thereof. Since the turning forces are applied to opposed ends of the dump 65b, the dump can be reliably pivoted at the discharge station, even when heavily loaded. As previously indicated, by appropriate arrangement of the pivot shafts 94b, drive sprockets 98b, and chains 100b, the dump 65b may be tipped in any desired direction.

In keeping with a further important aspect of this embodiment of the invention, counterbalance means are provided for minimizing bending deflection of the support platform when carrying heavily loaded dumps. The counterbalance means in this instance comprises a pair of support rollers 130 which are carried in outwardly and downwardly extending fashion from the side of the support channel 120 opposite that upon which the dump 65b is supported and which bear against the upstanding frame member 40b. The frame member 40b has a central strip 131 welded thereto for defining guide channels on opposite sides thereof for a pair of axially spaced rollers 130. It will be seen that even when the dump 65b is heavily loaded, downward deflection of the dump support platform 121 relative to the ball nut 76b tends to be prevented by the rollers 130 bearing engagement with frame member 40. The rollers 130 further guide movement of the dump during its travel along the ball screw so as to maintain its proper orientation.

From the foregoing, it can be seen that the lift apparatus of the present invention has a relatively simple design and the chain and sprocket automatic dumping means is adapted for reliable maintenance free operation, even in installations subject to considerable contamination and heavy loadings. The lift also is adapted for diversified use in installation where space is limited, with a plurality of dumps being operated from a central structural column. The simplified design also permits economical manufacture. While the lift of the subject invention has been illustrated for use in a solids removal system, it will be appreciated that it may be used in other material transfer systems.

What is claimed is:

1. A material lift apparatus comprising:
   a container,
   means for moving said container between a filling station in which material may be introduced into said container and a discharge station,
   means for supporting said container in a material containing upright condition while at said filling station and during movement from said filling station toward said discharge station,
   means responsive to movement of said container to said discharge station for pivoting said container to discharge material contained therein at said discharge station,
   said container pivoting means including a shaft fixed to said container, a sprocket fixed to said shaft, and a link chain mounted apart from said container in fixed relation adjacent to the path of movement of said container to said discharge station whereby as said container approaches said discharge station said sprocket engages said chain, causing rotation of said sprocket, shaft, and container, and
   said container moving means including a ball screw, a ball nut fixed to said container supporting means and operatively engaging said ball screw, and a drive motor for rotating said ball screw to move said ball nut, container supporting means, and container relative to said ball screw.

2. The lift apparatus of claim 1 in which said supporting means is a support plate upon which said container is positioned for relative pivotal movement, and said container pivoting means includes means supporting said shaft on said support plate for relative pivotal movement.

3. The lift apparatus of claim 1 in which said shaft has a portion extending outwardly of said container, an said sprocket is carried on said outwardly extending shaft portion.

4. The lift apparatus of claim 1 in which said sprocket is movable over said link chain a sufficient distance as said container approaches said discharge station for pivoting said container about 135° from an initial horizontal position.

5. The lift apparatus of claim 1 in which said container supporting means includes a container support platform formed of a plurality of members arranged in a rectangular configuration, said container being mounted for pivotal movement relative to said platform.

6. The lift apparatus of claim 1 in which a pair of said containers are supported in cantilever fashion on opposite sides of said ball screw.

7. A material lift apparatus comprising a container,
   means for moving said container between a filling station in which material may be introduced into said container and a discharge station,
   means for supporting said container in a material containing upright condition while at said filling station and during movement from said filling station toward said discharge station,
   means responsive to movement of said container to said discharge station for pivoting said container to discharge material contained therein at said discharge station, said container pivoting means including a shaft fixed to said container, a sprocket fixed to said shaft, and a link chain mounted apart from said container in fixed relation adjacent to the path of movement of said container to said discharge station whereby as said container approaches said discharge station said sprocket engages said chain, causing rotation of said sprocket, shaft, and container, said container moving means including a ball screw, a ball nut mounted in operative engagement with said ball screw, and a drive motor for rotating said ball screw to move said ball nut, said supporting means including a container support plate fixed to and extending from one side of said ball nut, said container being supported for pivotal movement relative to said plate, and counter balance means affixed to the other side of said ball nut for preventing tipping of said support plate relative to said ball screw.

8. The lift apparatus of claim 7 including an upstanding frame member, and means on said support plate engageable with said frame member for guiding movement of said container along said vertical path of travel.

9. The lift apparatus of claim 8 in which said frame member is a channel, and said guiding means includes a roller mounted on said support plate for rolling movement on said channel.

10. The lift apparatus of claim 7 including an upstanding frame member, said counter balance means including roller means affixed to said ball nut in bearing engagement with said upstanding frame member for resisting tipping of said container support.

11. The lift apparatus of claim 10 in which said roller means includes a pair of axially spaced rollers, and said upstanding frame member including a central rail portion disposed between said rollers for defining guide channels for guiding movement of said container support platform relative to said frame member and ball screw.

12. The lift apparatus of claim 7 in which said pivot means includes a pair of pivot shafts affixed to opposite ends of said container, and said platform includes a pair of support brackets for supporting said pivot shafts for relative rotational movement.

13. The lift apparatus of claim 7 including an upstanding frame member, said container being supported by said support plate in cantilever fashion outwardly from a side of said ball screw, and counter balance means including roller means affixed to said container support plate on a side of said ball screw opposite said container and being in bearing engagement with said upstanding frame member for resisting tipping of said container supporting means.

14. A material handling system comprising:
a flow channel for a solids containing liquid flow stream,
a screening device in said flow channel for removing solid materials from a flow stream,
raking means for removing solids from said screening device,
a lift apparatus including an open top container,
means for raising said container from a filling station where solids from said raking device may be introduced into said container and a discharge station located in elevated relation to said filling station and for lowering said container from said discharge station to said filling station,
means for supporting said container in a solids containing upright condition while at said filling station and during movement from said filling station toward said discharge station, and
means responsive to movement of said container to said discharge station for pivoting said container to discharge solids contained therein at said discharge station, said pivoting means including a shaft fixed to said container, a sprocket fixed to said shaft, and a link chain mounted apart from said container in fixed relation adjacent to the path of movement of said container to said discharge station whereby as said container approaches said discharge station said sprocket engages said chain, causing rotation of said sprocket, shaft, and container.

15. The material handling system of claim 14 in which said supporting means is a movable support plate upon which said container is positioned for relative pivotal movement, and said pivoting means pivots said container relative to said support plate.

16. The material handling system of claim 14 in which said container has a front side and a rear side, and said raking device is operable for causing solids to be introduced into said container from a front side thereof at said filling station, and said pivoting means is operable for pivoting said container at said discharge station such that said solids are discharged therefrom from said rear side.

17. The material handling system of claim 16 in which said shaft is affixed to said rear side of said container.

18. The material handling system of claim 14 in which said container has front and rear sides interconnected by a pair of ends, and said raking device is operable for causing solids to be introduced into said container from a front side at said filling station, and said pivot means is operable for pivoting said container at said discharge such that solids are discharged from one of said ends.

19. The material handling system of claim 18 in which said shaft is affixed to one of said container ends.

20. The lift apparatus of claim 14 including an upstanding frame member, and counter balance means including roller means affixed to said container supporting means and being in bearing engagement with said upstanding frame member for resisting tipping of said container supporting means.

21. A material lift apparatus comprising:
a container,
means for moving said container between a filling station in which material may be introduced into said container and a discharge station,
means for supporting said container in a material containing upright condition while at said filling station and during movement from said filling station toward said discharge station,
means responsive to movement of said container to said discharge station for pivoting said container to discharge material contained therein at said discharge station, and
said container pivoting means including a shaft fixed to said container, a pair of sprockets affixed to opposite ends of said shaft, and a pair of link chains supported apart from said container in fixed relation adjacent to the path of movement of said container to said discharge station whereby as said container approaches said discharge station said sprockets simultaneously engage said chains, causing rotation of said sprockets, shaft, and container.

22. A material lift apparatus comprising:

a plurality of material receiving containers, means for simultaneously moving said containers between a filling station in which material may be introduced into said containers and a discharge station, means for supporting said containers in a material containing upright conditions while at said filling station and during movement from said filling station toward said discharge station, means responsive to movement of said containers to said discharge station for simultaneously pivoting said containers to discharge materials contained therein, said container pivoting means including a respective shaft fixed to each said container, a sprocket fixed to each said shaft, and a link chain mounted apart from said containers in fixed relation adjacent to the path of movement of said containers to said discharge station whereby as said containers approach said discharge station the sprocket of the respective container engages said chain, causing rotation of the sprocket, the shaft upon which the sprocket is fixed, and the container, and said container moving means including a ball screw, a ball nut fixed to said supporting means and operatively engaging said ball screw, and a drive motor for rotating said ball screw to move said ball nut, supporting means, and containers relative to said ball screw.

23. The lift apparatus of claim 22 in which said supporting means is a movable support plate upon which said containers are positioned for relative pivotal movement, and said pivoting means pivots said container relative to said support plate.

* * * * *